United States Patent
Nakamura et al.

(10) Patent No.: US 11,353,086 B2
(45) Date of Patent: Jun. 7, 2022

(54) TORSIONAL VIBRATION DAMPER AND CONTROL DEVICE FOR TORSIONAL VIBRATION DAMPER

(71) Applicant: TOYOTA JIDOSHA KABUSHIKI KAISHA, Toyota (JP)

(72) Inventors: Taiki Nakamura, Zama (JP); Hideyuki Nishida, Sunto-gun (JP); Masayuki Ishibashi, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 54 days.

(21) Appl. No.: 17/086,896

(22) Filed: Nov. 2, 2020

(65) Prior Publication Data

US 2021/0156453 A1 May 27, 2021

(30) Foreign Application Priority Data

Nov. 27, 2019 (JP) .............................. JP2019-214382

(51) Int. Cl.
*F16F 15/14* (2006.01)
*F16F 15/00* (2006.01)

(52) U.S. Cl.
CPC .......... *F16F 15/145* (2013.01); *F16F 15/002* (2013.01); *F16F 2222/08* (2013.01); *F16F 2230/18* (2013.01); *F16F 2232/02* (2013.01); *F16F 2236/08* (2013.01)

(58) Field of Classification Search
CPC ....... F16F 15/14; F16F 15/1407; F16F 15/145
See application file for complete search history.

(56) References Cited

U.S. PATENT DOCUMENTS

| | | | |
|---|---|---|---|
| 2016/0195159 A1* | 7/2016 | Takikawa ................ | F16F 15/14 74/574.2 |
| 2017/0234401 A1* | 8/2017 | Horita .................... | F16F 15/145 74/572.21 |
| 2019/0048971 A1* | 2/2019 | Nishida ................... | F16F 15/31 |
| 2019/0048972 A1* | 2/2019 | Iwagaki .................. | F16F 15/31 |
| 2019/0170212 A1* | 6/2019 | Ishibashi .............. | F16F 15/1457 |
| 2019/0285136 A1* | 9/2019 | Ishibashi .............. | F16F 15/3156 |
| 2020/0088264 A1* | 3/2020 | Nakamura ........... | B62D 25/088 |
| 2020/0088265 A1* | 3/2020 | Nakamura ........... | F16F 15/1457 |
| 2021/0156453 A1* | 5/2021 | Nakamura ............ | F16F 15/002 |
| 2021/0164536 A1* | 6/2021 | Nakamura .......... | F16F 15/1457 |

FOREIGN PATENT DOCUMENTS

JP 2019-100498 A 6/2019

\* cited by examiner

*Primary Examiner* — Richard W Ridley
*Assistant Examiner* — Brian J McGovern
(74) *Attorney, Agent, or Firm* — Oliff PLC

(57) ABSTRACT

A torsional vibration damper that can reduce collision noise of an inertia body when a rotary member is stopped, and a control device therefore. In the torsional vibration damper, a rotary member is mounted on an output shaft of an engine such that none of rolling masses is situated within a predetermined angle range above a rotational center axis of the rotary member when the engine is stopped. Therefore, when the engine is stopped, the inertia body will not be supported by only one of the rolling masses situated within the predetermined angle range.

5 Claims, 8 Drawing Sheets

TORSIONAL VIBRATION DAMPER AND CONTROL DEVICE FOR TORSIONAL VIBRATION DAMPER

CROSS REFERENCE TO RELATED APPLICATION

The present disclosure claims the benefit of Japanese Patent Application No. 2019-214382 filed on Nov. 27, 2019 with the Japanese Patent Office, the disclosure of which is incorporated herein by reference in its entirety.

BACKGROUND

Field of the Disclosure

Embodiments of the present disclosure relate to the art of a torsional vibration damper for damping torsional vibrations resulting from pulsation of torque by an oscillating motion of an inertia mass, and a control device for controlling the torsional vibration damper. Especially, the embodiments of the present disclosure relate to a torsional vibration damper mounted on a vehicle that can be propelled while stopping an engine, and a control device for controlling the torsional vibration damper.

Discussion of the Related Art

JP-A-2019-100498 describes an example of a torsional vibration damper. The torsional vibration damper taught by JP-A-2019-100498 comprises: a rotary member rotated by torque of an engine; an inertia body that is allowed to rotate relatively to the rotary member; and a plurality of rolling members connecting the rotary member and the inertia body in a relatively-rotatable manner. According to the teachings of JP-A-2019-100498, a plurality of support sections are formed on an outer circumference of the rotary member at regular intervals. Specifically, each of the support sections is formed of a pair of protrusions, and the rolling member is held between the protrusions while being allowed to move in the radial direction. The inertia body as a ring member is arranged concentrically around the rotary member. A plurality of raceway surfaces to which the rolling member is centrifugally contacted respectively is formed on an inner circumference of the inertia body. A curvature radius of the raceway surface is shorter than a curvature radius of the rotary member.

When the rotary member is rotated by the torque the engine, each of the rolling members is centrifugally displaced radially outwardly along the support sections and pushed onto the raceway surface. That is, the rotary member is connected to the inertia body. In this situation, if the torque is applied to the rotary member smoothly without pulsation, the rotary member, the inertia body, and the rolling members are rotated integrally. However, the rotary member is vibrated inevitably by pulsation of the torque applied thereto, and consequently an angular acceleration of the rotary member is changed. As a result, the inertia body is rotated relatively to the rotary member by an inertia force. Such relative rotation between the inertia body and the rotary member is also caused by oscillating motions of the rolling members rolling on the raceway surfaces. In addition, since the curvature radius of the raceway surface is shorter than the curvature radius of the rotary member, the rolling member is pushed back in the support section radially inwardly by the raceway surface, as the rolling member approaches to a circumferential end of the raceway surface. As a result, the inertia body being rotated relatively to the rotary member is subjected to a circumferential force to be pushed back toward an initial position relative to the rotary member. Such circumferential force is applied to the inertia body in both circumferential directions so that the inertia body is oscillated in the circumferential direction. As described, the rolling member is allowed to move radially within the support section, but an oscillating motion of the rolling member is restricted by the support section. Therefore, a reaction force established by the oscillating motion of the inertia body acts as a vibration damping force to suppress vibrations of the rotary member resulting from torque pulse.

For example, the torsional vibration damper taught by JP-A-2019-100498 may be applied to an output shaft of a hybrid vehicle in which a prime mover includes the engine and a motor. For example, in an electric vehicle mode, the hybrid vehicle is powered only by the motor while stopping the engine. Since the engine is stopped in the electric vehicle mode, a rotation of the rotary member of the torsional vibration damper is stopped during propulsion in the electric vehicle mode. In the hybrid vehicle, the engine is mounted such that an output shaft thereof extends in a horizontal way, therefore, the rotary member and the inertia body are rotated in a horizontal fashion around a rotational center axis. That is, when the engine is stopped, the rolling members and the inertia body drop gravitationally. In this case, if the rotary member is stopped such that one of the rolling members is situated immediately above the rotational center axis of the rotary member, the inertia body is supported by only one of the rolling members. In this situation, the inertia body collide against the rotary member due to vibrations generated during propulsion, and consequently large collision noise is induced due to collision of the inertia body against the rotary member.

SUMMARY

The present disclosure has been conceived noting the above-described technical problems, and it is therefore an object of the present disclosure to provide a torsional vibration damper that can reduce collision noise of an inertia body when a rotary member is stopped, and a control device for the torsional vibration damper.

According to one aspect of the present disclosure, there is provided a torsional vibration damper, comprising: a rotary member that is rotated integrally with an output shaft of an engine; a plurality of rolling masses, each of which is held by the rotary member to revolve around a rotational center axis of the rotary member by rotating of the rotary member, while being allowed to move in a radial direction; and an inertia body that is arranged concentrically with the rotary member. The inertia body comprises a plurality of raceway surfaces to which the rolling masses are contacted centrifugally. Specifically, a curvature radius of each of the raceway surfaces is individually shorter than a curvature radius of an outer circumference of the rotary member. When the engine is stopped, the output shaft of the engine is stopped at a predetermined angle. In order to achieve the above-explained objective, the rotary member is mounted on the output shaft such that none of the rolling masses is situated within a predetermined angle range of the rotary member immediately above the rotational center axis of the rotary member when the engine is stopped. Specifically, the predetermined angle range is a range in which the inertia body is to be supported by only one of the rolling masses gravitationally dropped onto the rotary member.

According to another aspect of the present disclosure, there is provided a control device for the torsional vibration damper comprising: a rotary member that is rotated integrally with an output shaft of an engine; a plurality of rolling masses, each of which is held by the rotary member to revolve around a rotational center axis of the rotary member by rotating the rotary member, while being allowed to move in a radial direction; and an inertia body that is arranged concentrically with the rotary member. The inertia body comprises a plurality of raceway surfaces to which the rolling masses are contacted centrifugally. Specifically, a curvature radius of each of the raceway surfaces is individually shorter than a curvature radius of an outer circumference of the rotary member. In order to achieve the above-explained objective, the control device is provided with a controller that controls an angle of the rotary member when stopping the engine. The controller is configured to adjust the angle of the output shaft such that none of the rolling masses is situated within a predetermined angle range of the rotary member immediately above the rotational center axis of the rotary member when the engine is stopped. Specifically, the predetermined angle range is a range in which the inertia body is to be supported by only one of the rolling masses gravitationally dropped onto the rotary member.

In a non-limiting embodiment, the inertia body may include a ring-shaped member in which an inner diameter is larger than an outer diameter of the rotary member. The inertia body may be arranged around the rotary member while being overlapped at least partially in an axial direction. The torsional vibration damper may further comprise a buffer member that is interposed between the rotary member and the inertia body to absorb a collision impact of the inertia body drooped gravitationally when stopping the engine.

In a non-limiting embodiment, the output shaft may be connected to a motor, and the controller may be further configured to adjust the angle of the output shaft such that none of the rolling masses is situated within the predetermined angle range by controlling the motor when the engine is stopped.

According to the embodiment of the present disclosure, the rotary member of the torsional vibration damper is fitted onto the rotary shaft of the engine so that the rotary member is rotated by torque of the engine. When the rotary member is rotated by a torque of the engine, the rolling masses are centrifugally displaced radially outwardly, and eventually pushed onto the raceway surfaces. A rotation of the rotary member is pulsated inevitably by pulsation of the torque applied thereto, and consequently an angular acceleration of the rotary member is changed. As a result, the inertia body is oscillated relatively to the rotary member by an inertia force, and each of the rolling masses rolls along the raceway surface. As described, since the curvature radius of the raceway surface is shorter than the curvature radius of the outer circumference of the rotary member, the rolling mass rolls thereon is pushed back radially inwardly by the raceway surface, as the rolling mass approaches a circumferential end of the raceway surface. Consequently, the rolling mass is centrifugally displaced radially outwardly again, and a component of force resulting from such displacement of the rolling mass is applied to the inertia body in the direction to bring the rolling mass into contact to a neutral position of the raceway surface. As a result, the inertia body is oscillated relatively to the rotary member, and a torque of the inertia body established by such relative oscillation serves as a vibration damping torque to damp the vibrations on rotary members rotated by the torque of the engine.

When the engine is stopped, the rotation of the rotary member is stopped, and the rolling masses and the inertia body drop gravitationally. As described, according to one aspect of the present disclosure, the rotary member is mounted on the output shaft in such a manner that none of the rolling masses is situated within the predetermined angle range of the rotary member in which the inertia body is to be supported by only one of the rolling masses situated swhen the engine is stopped. Otherwise, according to another aspect of the present disclosure, an angle of the output shaft is adjusted in such a manner that none of the rolling masses is situated within the predetermined angle range of the rotary member when the engine is stopped. In other words, according to the present disclosure, the inertia body is supported by a plurality of the rolling masses when the engine is stopped. For this reason, the inertia body will not be oscillated widely by vibrations and will not collide against the other members during propulsion in an electric vehicle mode. That is, noise in the torsional vibration damper can be reduced, and damages of e.g., the inertia body and the rolling members can be limited.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION

Examples of the present disclosure will now be explained with reference to the accompanying drawings. For example, a torsional vibration damper according to the present disclosure may be applied to a vehicle having an internal combustion engine such as a gasoline engine and a diesel engine. An output torque of the engine pulsates inevitably. The torsional vibration damper according to the present disclosure comprises a rotary member connected to an output shaft of the engine in a torque transmittable manner, and an inertia body arranged coaxially with the rotary member. The inertia body is oscillated by pulsation of a torque of the engine, and vibrations of the rotary member resulting from the pulsation of the torque of the engine is damped by such oscillating motion of the inertia body. In the torsional vibration damper, the inertia body is supported by the rotary member at a plurality of points.

First Example

Figure 1:
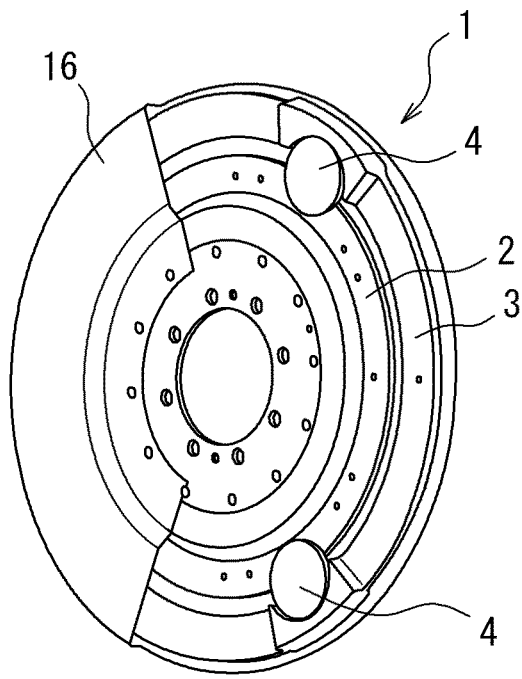
FIG. 1 is a perspective view showing the torsional vibration damper according to a first example of the present disclosure.

Here will be explained the first example of the present disclosure with reference to FIGS. 1 to 3. As illustrated in FIG. 1, the torsional vibration damper 1 comprises: a rotary member 2 that is rotated by a torque applied thereto; an inertia body 3 as a mass arranged coaxially and concentrically with the rotary member 2; and a plurality of rolling mass 4 connecting the rotary member 2 to the inertia body 3 to transmit torque applied to the rotary member 2 to the inertia body 3. According to the first example shown in FIG. 1, total three rolling mass 4 are interposed between the rotary member 2 and the inertia body 3.

The rotary member 2 is mounted on an output shaft of the engine or a shaft connected to the output shaft of the engine (neither of which are shown) to be rotated integrally therewith. In order to startup the engine smoothly, the output shaft of the engine is sopped within a predetermined angular range when the engine is stopped. That is, the engine is stopped such that a crank angle falls within a predetermined range. According to the present disclosure, therefore, the rotary member 2 is mounted e.g., on the output shaft of the engine in such a manner that none of the rolling masses 4 is situated within an after-mentioned predetermined range when the engine is stopped. In other words, a relative position of the rotary member 2 with respect to e.g., the output shaft of the engine is determined in such a manner that none of the rolling masses 4 is situated within the after-mentioned predetermined range when the engine is stopped.

As illustrated in FIG. 1, the rotary member 2 is a disc plate member whose thickness is substantially identical to or slightly thinner than a length of a diametrically smaller section 4A of the rolling mass 4. As illustrated in FIG. 2, a plurality of retainers 5 are formed on a circumference of the rotary member 2 at regular intervals, and the rolling mass 4 is held in each of the retainers 5. The retainer 5 comprises a pair of stoppers 6 each of which protrudes radially outwardly from the circumference of the rotary member 2. A thickness of each of the stoppers 6 is substantially identical to a thickness of the rotary member 2, and a clearance between the stoppers 6 in the circumferential direction is substantially identical to or slightly wider than an outer diameter of the diametrically smaller section 4A of the rolling mass 4. That is, the rolling masses 4 revolve around the shaft on which the rotary member 2 is mounted when the rotary member 2 is rotated, but oscillation of each of the rolling mass 4 within the retainer 5 is restricted by the stoppers 6. In the retainer 5, the rolling mass 4 is allowed to move in the radial direction between a bottom of the retainer 5 (i.e., the outer circumference of the rotary member 2) and an after-mentioned raceway surface 7 of the inertia body 3. Thus, the torque of the rotary member is transmitted to the rolling mass 4 at each contact point between the rolling mass 4 and the stopper 6 of the retainer 5.

The inertia body 3 is a ring member arranged concentrically around the rotary member 2 while being overlapped with the rotary member 2 at least partially in the axial direction. As illustrated in FIGS. 1 and 2, a plurality of the raceway surfaces 7 are formed on an inner circumference of the inertia body 3 at regular intervals. Specifically, a raceway surface 7 is formed on both sides of the inertia body 3 and hence a thickness of the pair of raceway surface 7 is thicker than a thickness of the inertia body 3. That is, the raceway surfaces 7 protrudes from the inertia body 3 in both axial directions. The raceway surface 7 is an arcuate depression whose curvature radius is shorter than a curvature radius of the outer circumference of the rotary member 2.

An aligning piece 8 protrudes radially inwardly from between the pair of raceway surfaces 7. Specifically, a thickness of the aligning piece 8 is substantially identical to or slightly thinner than the thickness or the rotary member 2 and the length of the diametrically smaller section 4A of the rolling mass 4. A protruding length of the aligning piece 8 is set such that the diametrically smaller section 4A of the rolling mass 4 will not come into contact to the aligning piece 8 throughout a circumferential length of the raceway surface 7, when the rolling mass 4 is centrifugally pushed onto the raceway surface 7 and the inertia body 3 is oscillated by pulsation of the torque applied to the rotary member 2. That is, the protruding length of the aligning piece 8 is shorter than a length between the diametrically smaller section 4A and an after-mentioned diametrically larger section 4B of the rolling mass 4 so that the rolling mass 4 is allowed to roll smoothly on the raceway surface 7. As a result of the fact that the rolling mass 4 is centrifugally pushed onto the raceway surface 7, the torque of the rotary member 2 is transmitted to the inertia body 3 though the rolling mass 4. As explained above, the inertia body 3 is oscillated relatively to the rotary member 2 by the pulsation of the torque applied to the rotary member 2, and consequently, each of the rolling masses 4 is reciprocated along the raceway surface 7. In this situation, since the curvature radius of the raceway surface 7 is shorter than the curvature radius of the outer circumference of the rotary member 2, the rolling mass 4 is pushed back radially inwardly by the raceway surface 7 as the rolling mass 4 approaches a circumferential end of the raceway surface 7. Consequently, the rolling mass 4 is centrifugally displaced radially outwardly again, and a component of force resulting from such displacement of the rolling mass 4 is applied to the inertia body 3 in the direction to bring the rolling mass 4 into contact to the neutral position NP of the raceway surface. As a result, the inertia body 3 is oscillated relatively to the rotary member 2, and a torque of the inertia body 3 established by such relative oscillation serves as a vibration damping torque.

Figure 2:
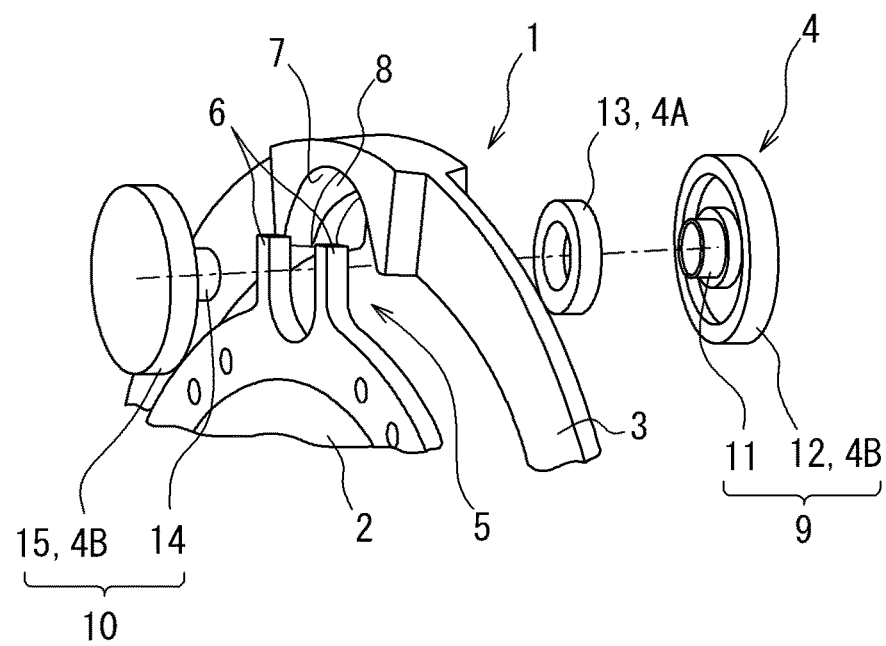
FIG. 2 is an exploded view showing constitutional elements of the torsional vibration damper shown in FIG. 1.
Figure 3:
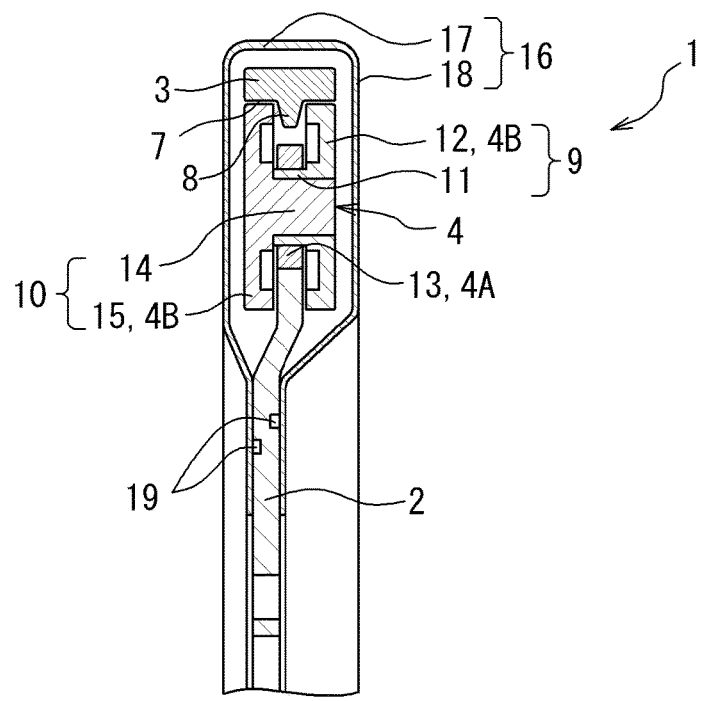
FIG. 3 is a partial cross-sectional view showing a cross-section of the torsional vibration damper shown in FIG. 1.

As illustrated in FIGS. 2 and 3, the rolling mass 4 has an H-shaped cross-section. That is, diametrically larger section 4B of the rolling mass 4 is brought into contact to the aligning piece 8 of the inertia body 3 and the stopper 6 of the rotary member 2 when the rolling mass 4 is displaced in the axial direction, thereby preventing detachment of the rolling mass 4 from the torsional vibration damper 1.

Specifically, the rolling mass 4 comprises a first mass 9 and a second mass 10. The first mass 10 comprises a hollow cylindrical first shaft section 11, and a first flange section 12 formed around one of axial ends of the first shaft section 11. A length of the first shaft section 11 is longer than a thickness of the rotary member 2, and a bearing (or bush) 13 is fitted onto the first shaft section 11 so that the rolling mass 4 rolls on the raceway surface 7 without slippage. That is, the bearing 13 is brought into contact to the raceway surface 7 when the rolling mass 4 is centrifugally displaced radially outwardly. An outer diameter of the bearing 13 is smaller than an outer diameter of the first flange section 12 and hence the bearing 13 serves as the above-mentioned diametrically smaller section 4A of the rolling mass 4. The outer diameter of the first flange section 12 is larger than the diametrically smaller section 4A and wider than an opening width of the retainer 5.

The second mass 10 comprises a column-shaped second shaft section 14 whose outer diameter is substantially identical to an inner diameter of the first shaft section 11 of the first mass 9, and a second flange section 15 formed around one of axial ends of the second shaft section 14. A length of the second shaft section 14 is set substantially identical to the length of the first shaft section 11 so as not to protrude from the first shaft section 11. An outer diameter of the second flange section 15 is substantially identical to the outer diameter of the first flange section 12, accordingly, the first flange section 12 and the second flange section 15 serve as the above-mentioned diametrically larger section 4B of the rolling mass 4. A shallow circumferential groove is formed on each surface of the first flange section 12 and the second flange section 15 opposed to each other.

The inertia body 3, the rolling mass 4, and the rotary member 2 are covered by a cover 16 to be protected from oil, dust, water and so on. According to the exemplary embodiment of the present disclosure, the cover 16 comprises a first cover 17 and a second cover 18, and the first cover 17 and the second cover 18 are joined to each other to form the cover 16 by welding or by a rivet. In order to keep an internal space of the cover 16 in which the rolling mass 4 is held in a liquid-tight condition, a sealing member 19 is interposed between the first cover 17 and the rotary member 2, and between the second cover 18 and the rotary member 2. The first cover 17 and the second cover 18 are fixed to the rotary member 2 by e.g., rivets at a radially inner portion.

Figure 4:
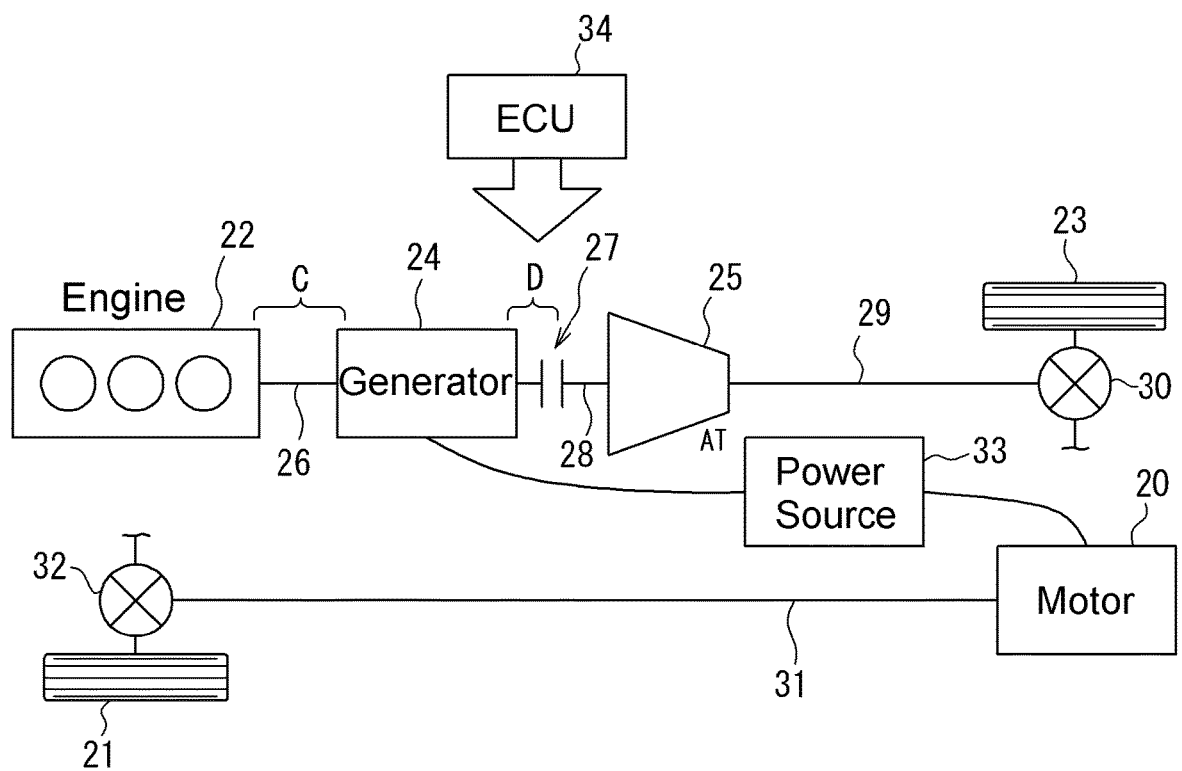
FIG. 4 is a schematic illustration showing one example of a structure of a vehicle to which the torsional vibration damper and the control device thereof according to the embodiment of the present disclosure are applied.

Turning to FIG. 4, there is shown one example of a structure of a vehicle to which the torsional vibration damper 1 according to the exemplary embodiment of the present disclosure is applied. The vehicle shown in FIG. 4 is a four-wheel-drive layout vehicle in which a pair of front wheels 21 is driven by a motor 20, and a pair of rear wheels 23 is rotated by an engine 22. In the vehicle, the engine 22 is arranged in a front section of the vehicle in such a manner that an output shaft 26 thereof extends toward a rear section of the vehicle, and a generator (referred to as "MG1" in FIG. 4) 24 and an automatic transmission (as will be simply called the "transmission" hereinafter) 25 are arranged in order toward the rear section of the vehicle. Specifically, the output shaft 26 of the engine 22 and a rotor shaft (not shown) of the generator 24 are connected to an input shaft 28 of the transmission 25 through a starting clutch 27.

For example, an internal combustion engine such as a gasoline engine and a diesel engine may adopted as the engine 22. An opening degree of a throttle valve (not shown) and a fuel injection is changed in accordance with a position of an accelerator pedal (not shown) so that the engine 22 generates a torque in accordance with the position of an accelerator pedal. On the other hand, the generator 24 as a motor of the exemplary embodiment is a motor-generator such as a permanent magnet synchronous motor. The generator 24 is rotated by the engine 22 to generate electricity, and the engine 22 is cranked by operating the generator 24 as a starting motor.

The engine 22 is selectively connected and disconnected to/from the transmission 25 by manipulating the starting clutch 27 as a friction clutch in which a torque transmitting capacity thereof is controlled electrically. For example, a multiple-plate clutch, a single-plate clutch, a dry clutch, a wet clutch may be adopted as the starting clutch 27. In order to launch the vehicle smoothly without causing an engine stall and without generating sudden acceleration, the starting clutch 27 is engaged in such a manner that the torque transmitting capacity thereof increases gradually when launching the vehicle. As the transmission 25, a conventional geared transmission or a continuously variable transmission may be employed, and a speed ratio of the transmission 25 is also controlled electrically.

An output shaft (not shown) is connected to a rear differential gear unit 30 through a rear propeller shaft 29 so that the torque is distributed to the rear wheels 23 from the rear differential gear unit 30.

As the generator 24, a permanent magnet synchronous motor may also be adopted as the motor 20. According to the exemplary embodiment of the present disclosure, the motor 20 is arranged in such a manner that an output shaft (not shown) as a rotor shaft thereof extends toward the front section of the vehicle in parallel with the rear propeller shaft 29 to be connected to a front propeller shaft 31. The front propeller shaft 31 is connected to a front differential gear unit 32 so that the torque is distributed to the front wheels 21 from the front differential gear unit 32.

The generator 24 and the motor 20 are electrically connected with a power source 33 including an electric storage device such as a battery and a capacitor, and an inverter or a converter. Therefore, the generator 24 and the motor 20 are operated as a motor respectively by supplying electricity to the generator 24 and the motor 20 from the power source 33, and electricity generated by the generator 24 and the motor 20 may be accumulated in the power source 33. In addition, the motor 20 may also be operated to propel the vehicle by supplying electricity generated by the generator 24. Thus, the vehicle shown in FIG. 4 may be powered not only by the engine 22 but also by the generator 24 and the motor 20. In other words, a torque required to propel the vehicle may be generated not only by the engine 22 but also by the generator 24 and the motor 20, and hence an operating mode of the vehicle may be selected from a plurality of modes. For example, the vehicle shown in FIG. 4 may be propelled in an electric vehicle mode in which the required torque is generated by the motor 20 while stopping the engine 22.

The engine 22, the motor 20, the generator 24, the transmission 25 and so on are controlled by an electronic control unit (to be abbreviated as the "ECU" hereinafter) 34 as a controller. The ECU 34 comprises a microcomputer as its main constituent configured to perform a calculation based on an incident data and data stored in advance, and to transmit a calculation result in the form of command signal. To this end, the ECU 34 receives data about rotational speeds of the front wheels 21 the rear wheels 23 speeds and torques of the motor 20 and the generator 24, a position of the accelerator pedal, a state of charge level of the electric storage device, a speed of the engine 22, a rotational angle of the output shaft 26 of the engine 22 (i.e., a crank angle), an on/off signal of a brake, a speed of the input shaft 28, speeds of the front propeller shaft 31 and the rear propeller shaft 29, and so on. For example, the ECU 34 transmits command signals for engaging and disengaging the starting clutch 27, command signals for controlling the motor 20 and the generator 24, a command signal for changing the throttle valve of the engine 22, a command signal for shifting a gear stage o the transmission 25 and so on. The ECU 34 may be integrated an engine control unit, a motor control unit, a transmission control unit and so on.

In order to deliver the torque of the engine 22 to the transmission 25 while damping torsional vibrations resulting from pulsation of the torque of the engine 22, the torsional vibration damper 1 is disposed upstream of the starting clutch 27. To this end, for example, the torsional vibration damper 1 may be arranged in a region C shown in FIG. 4 between the engine 22 and the generator 24. In this case, specifically, the rotary member 2 of the torsional vibration damper 1 is fitted onto the output shaft 26 of the engine 22 or the rotor shaft of the generator 24 to be rotated integrally with those shafts. Instead, the torsional vibration damper 1 may also be arranged in a region D shown in FIG. 4 between the generator 24 and the starting clutch 27. In this case, specifically, the rotary member 2 of the torsional vibration damper 1 is fitted onto the rotor shaft of the generator 24 or an input member of the starting clutch 27 to be rotated integrally with the rotor shaft or the input member. In a case of employing a multiple plate clutch as the starting clutch 27, a frictional contact area in the starting clutch 27 can be ensured by the plurality of plates, and hence an outer diameter of the starting clutch 27 can be reduced. In this case, therefore, the torsional vibration damper 1 may also be arranged around the starting clutch 27.

Figure 5A:
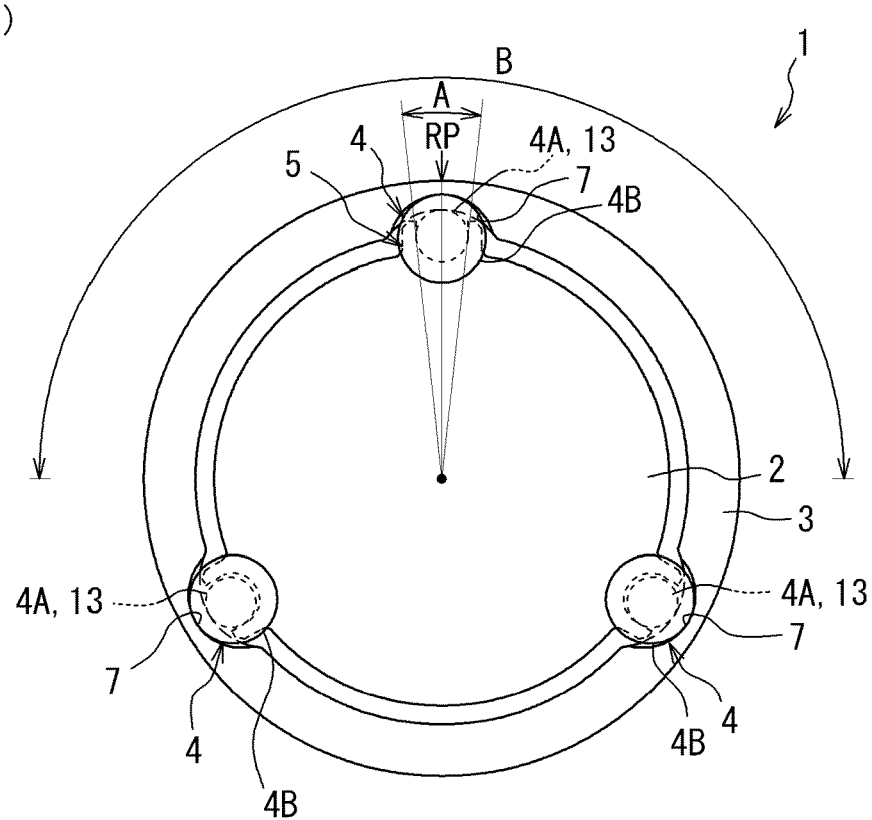
FIG. 5A is a front view showing a situation in which one of rolling masses is situated within a predetermined range.
Figure 5:
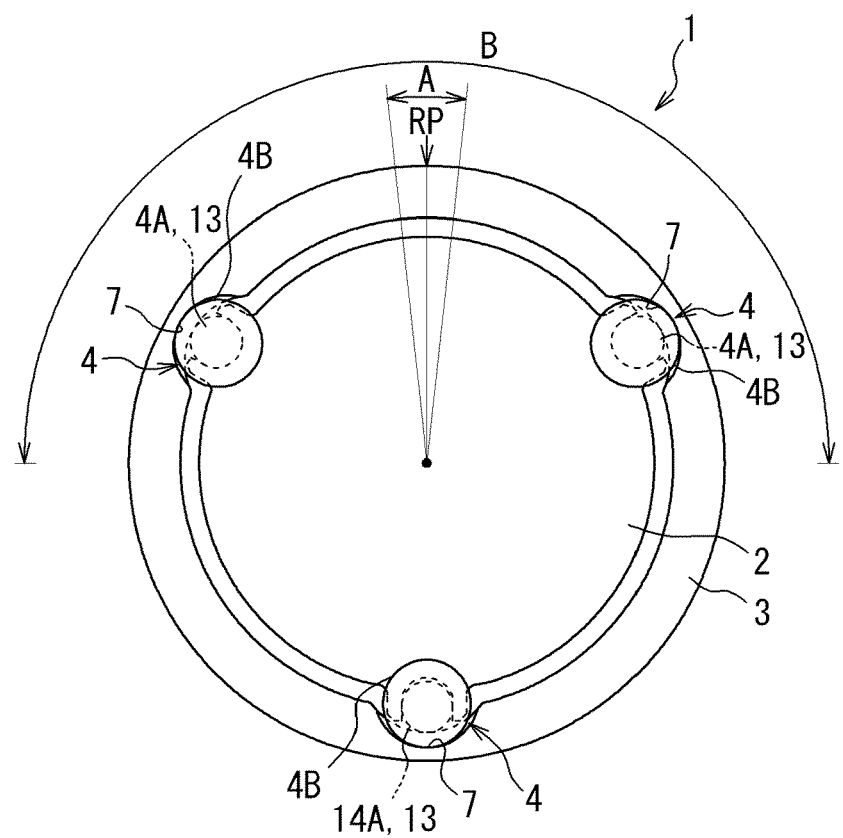
FIG. 5B is a front view showing a situation in which none of the rolling masses is situated within the predetermined range.

Here will be explained stop positions of the rolling masses 4 with reference to FIGS. 5A and 5B. FIG. 5A shows a situation in which the rotary member 2 stops at a rotational angle at which one of the rolling masses 4 is situated within a predetermined range A expanding around a reference position RP immediately above the rotational center axis of the rotary member 2. In turn, FIG. 5B shows a situation in which the rotary member 2 stops at a rotational angle at which none of the rolling masses 4 is situated within the predetermined range A. If the rotary member 2 stops at the angle shown in FIG. 5A as a result of stopping the engine 22, one of the rolling masses 4 situated within the predetermined range A drops gravitationally, and the diametrically smaller section 4A thereof comes into contact to a bottom of the retainer 5. At the same time, the inertia body 3 drops gravitationally onto said one of the rolling masses 4. In this situation, the other two of the rolling masses 4 are situated in a lower half section of the rotary member 2, and also drop gravitationally along the stoppers 6 of the retainers 5 downwardly and radially outwardly. Consequently, each of the diametrically smaller sections 4A of the other two of rolling masses 4 individually moves away from the bottom of the retainer 5, and each of the diametrically larger sections 4B of the other two of rolling masses 4 individually comes into contact to the raceway surface 7. That is, the inertia body 3 is supported only by one of the rolling masses 4 situated within the predetermined range A. In other words, the inertia body 3 hangs only on one of the rolling masses 4 situated within the predetermined range A. In this situation, the inertia body 3 is oscillated widely by vibrations during propulsion in the electric vehicle mode, and collides against the other members. In addition, since the inertia body 3 is supported by only one of the rolling masses 4, collision noises may be amplified by resonance.

By contrast, if the rotary member 2 stops at the angle shown in FIG. 5B, two of the rolling masses 4 are situated within an upper half section B of the rotary member 2 outside of the predetermined range A. That is, the inertia body 3 is supported by two of the rolling masses 4 in a relatively stable manner compared to the case shown in FIG. 5A.

In order to startup the engine 22 smoothly, the output shaft 26 of the engine 22 is stopped within a predetermined a range of a crank angle when stopping the engine 22. According to the first example of the present disclosure, therefore, the rotary member 2 is mounted on the output shaft 26 of the engine 22 in such a manner that the rotary member 2 is stopped at the angle shown in FIG. 5B when stopping the engine 22.

Figure 6:
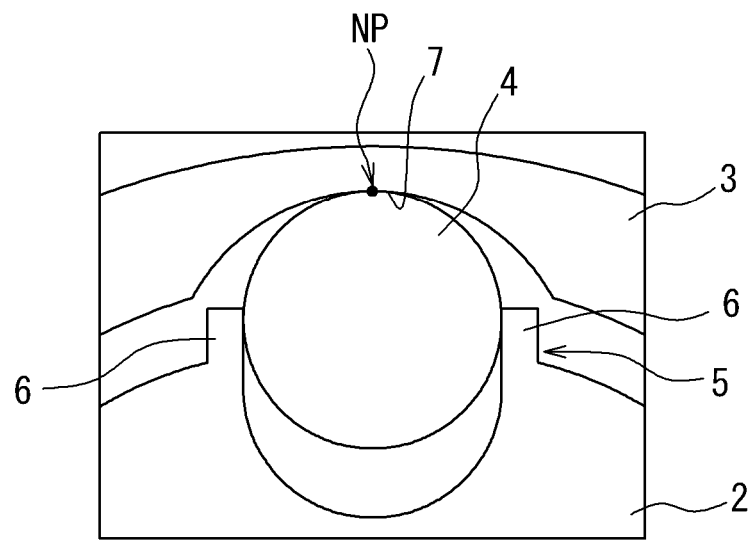
FIG. 6 is a partial enlarged view showing a situation in which the rolling mass is pushed onto a neutral point in a raceway surface of an inertia body.

When the vehicle is powered by the engine 22, the rotary member 2 is rotated by the torque of the engine 22. Consequently, each of the rolling mass is individually displaced radially outwardly within the retainer 5 by the centrifugal force, and eventually pushed onto the raceway surface 7 of the inertia body 3 when the centrifugal force overwhelms the gravitational force as illustrated in FIG. 6. In this situation, if the torque of the engine 22 is not pulsated, each of the rolling masses 4 is individually situated at a neutral position NP as a furthest point from the rotational center axis of the rotary member 2 in the raceway surface 7. As a result, the torsional vibration damper 1 is rotated integrally.

Figure 7:
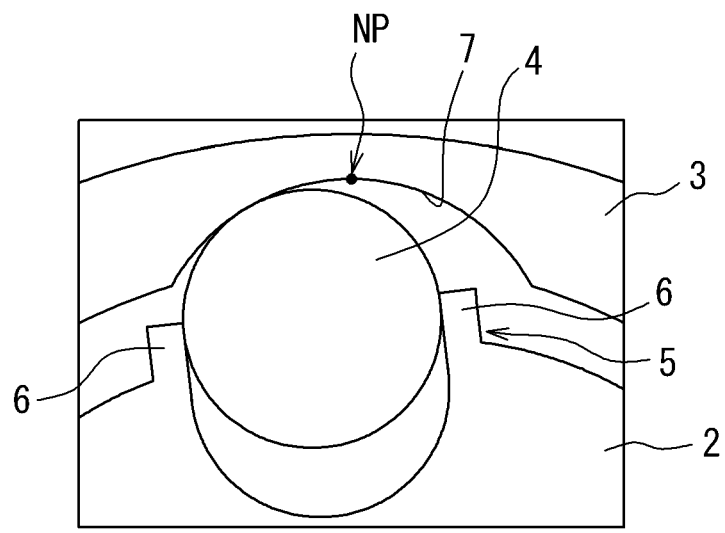
FIG. 7 is a partial enlarged view showing a situation in which the rolling mass is pushed onto one end of the raceway surface.
Figure 8:
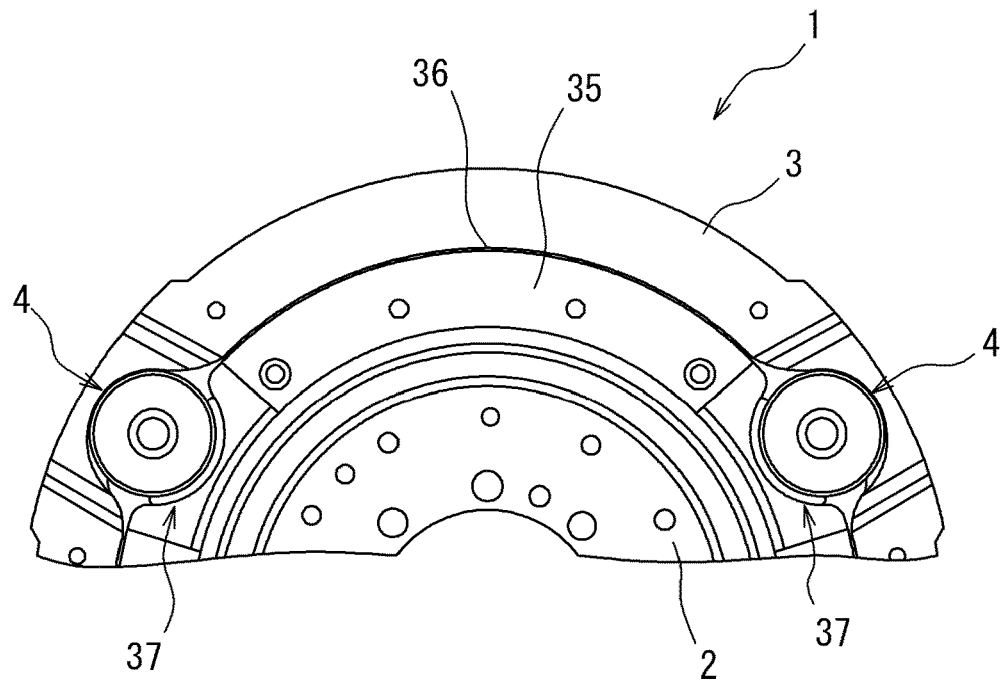
FIG. 8 is a partial cutaway view showing a torsional vibration damper according to a second example of the present disclosure.

However, the torque of the engine 22 is pulsated inevitably, and hence the rotation of the rotary member 2 is pulsated. In this situation, the inertia body 3 is oscillated relatively to the rotary member 2 by an inertia force, and consequently, each of the rolling masses 4 rolls along the raceway surface 7. As described, since the curvature radius of the raceway surface 7 is shorter than the curvature radius of the outer circumference of the rotary member 2, the rolling mass 4 is pushed back radially inwardly as illustrated in FIG. 7 by the raceway surface 7, as the rolling mass 4 approaches a circumferential end of the raceway surface 7. Consequently, the rolling mass 4 is centrifugally displaced radially outwardly again, and a component of force resulting from such displacement of the rolling mass 4 is applied to the inertia body 3 in the direction to bring the rolling mass 4 into contact to the neutral position NP of the raceway surface 7. As a result, the inertia body 3 is oscillated relatively to the rotary member 2, and a torque of the inertia body 3 established by such relative oscillation serves as a vibration damping torque to damp the vibrations on the rotary members and the shafts connected to the starting clutch 27. For this reason, the torsional vibrations resulting from the pulsation of the engine torque will not be propagated to the rotary shafts of downstream of the transmission 25. In other words, a smoothened torque is delivered to the rotary shafts of downstream of the transmission 25.

When the engine 22 is stopped and the starting clutch 27 is disengaged, the rotation of the rotary member 2 is stopped, and the rolling masses 4 and the inertia body 3 drop gravitationally. As described, the output shaft 26 of the engine 22 is stopped within the predetermined the range of a crank angle when stopping the engine 22, and the rotary member 2 is mounted on the output shaft 26 of the engine 22 in such a manner that the rotary member 2 is stopped at the angle shown in FIG. 5B when stopping the engine 22. According to the exemplary embodiment of the present disclosure, therefore, none of the rolling masses 4 is situated within the predetermined range A when the engine 22 is stopped, and in this situation, the inertia body 3 is supported by two of the rolling masses 4 situated within the upper half section B of the rotary member 2 outside of the predetermined range A.

For these reasons, during propulsion in the electric vehicle mode while stopping the engine 22, the inertia body 3 will not be oscillated widely by vibrations and will not collide against the other members. In addition, since the inertia body 3 is supported by the plurality of the rolling masses 4, a weight of the inertia body 3 and a collision impact may be received by plurality of points. For this reason, damage of the inertia body 3 and the rolling masses 4 may be limited compared to the case of supporting the inertia body 3 by only one of the rolling masses 4.

Second Example

Turning to FIG. 2, there is shown the torsional vibration damper 1 according to the second example of the present disclosure. According to the second example, a ring-shaped buffer member 35 made of e.g., synthetic resin is attached to an outer circumferential edge of the rotary member 2 to absorb a collision impact of the inertia body 3. The buffer member 35 comprises a contact surface 36 covering the outer circumferential edge of the rotary member 2. Specifically, a curvature of the contact surface 36 is substantially identical to a curvature of the inner circumferential surface of the inertia body 3, and the inner circumferential surface of the inertia body 3 dropping gravitationally comes into contact to the contact surface 36. According to the second example, a clearance between the contact surface 36 of the buffer member 35 and the inner circumferential surface of the inertia body 3 is set such that the inner circumferential surface of the inertia body 3 will not come into contact to the contact surface 36 of the buffer member 35 when the inertia body 3 is rotated while establishing the inertia torque.

Figure 9:
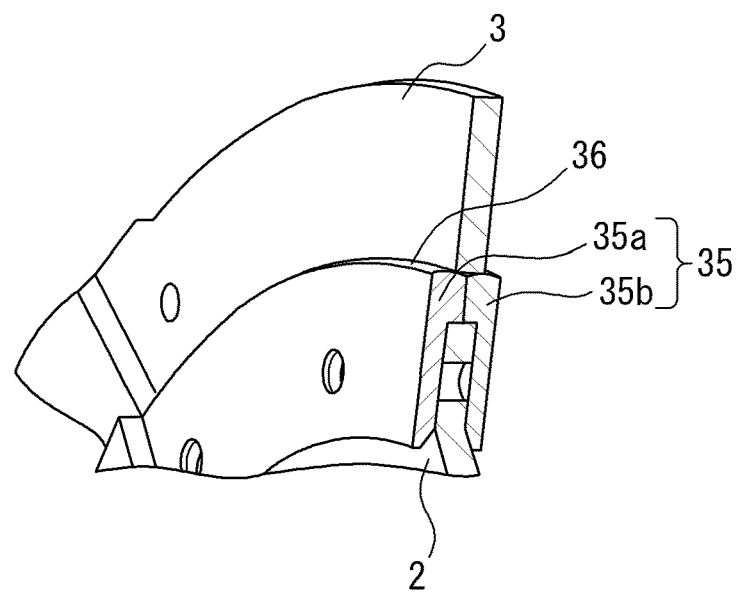
FIG. 9 is a partial enlarged view showing a buffer member according to the second example.

Each portion of the buffer member 35 covering the retainer 5 is depressed radially inwardly to serve as a depression 37 so that the rolling mass 4 held in the retainer 5 is allowed to reciprocate in the radial direction smoothly within the retainer 5. Specifically, a curvature of the depression 37 is substantially identical to a curvature of the diametrically larger section 4B of the rolling mass 4. A predetermined clearance is also maintained between the depression 37 and the diametrically larger section 4B of the rolling mass 4 situated at the bottom of the retainer 5. As illustrated in FIG. 9, specifically, the buffer member 35 has a two-piece structure including a first buffer member 35a covering the outer circumferential edge of one surface of the rotary member 2 and a second buffer member 35b covering the outer circumferential edge of the other surface of the rotary member 2. The first buffer member 35a, the rotary member 2, and the second buffer member 35b are fixed to one another by rivets or bolts. The remaining structure of the torsional vibration damper 1 according to the second example is identical to that of the first example, and detailed explanations for the common structure will be omitted.

According to the second example, when the inertia body 3 drops gravitationally, the inner circumferential surface of the inertia body 3 comes into contact to the buffer member 35. A described, the buffer member 35 is made of e.g., synthetic resin, and the curvature of the contact surface 36 of the buffer member 35 is substantially identical to the curvature of the inner circumferential surface of the inertia body 3. According to the second example, therefore, the collision impact of the inertia body 3 against the rotary member 2 is absorbed by the buffer member 35 thereby further reducing the collision noise in the torsional vibration damper 1. In addition, since the curvature of the contact surface 36 of the buffer member 35 is substantially identical to the curvature of the inner circumferential surface of the inertia body 3, damages of the rotary member 2 and the inertia body 3 can be limited.

Third Example

Figure 10:
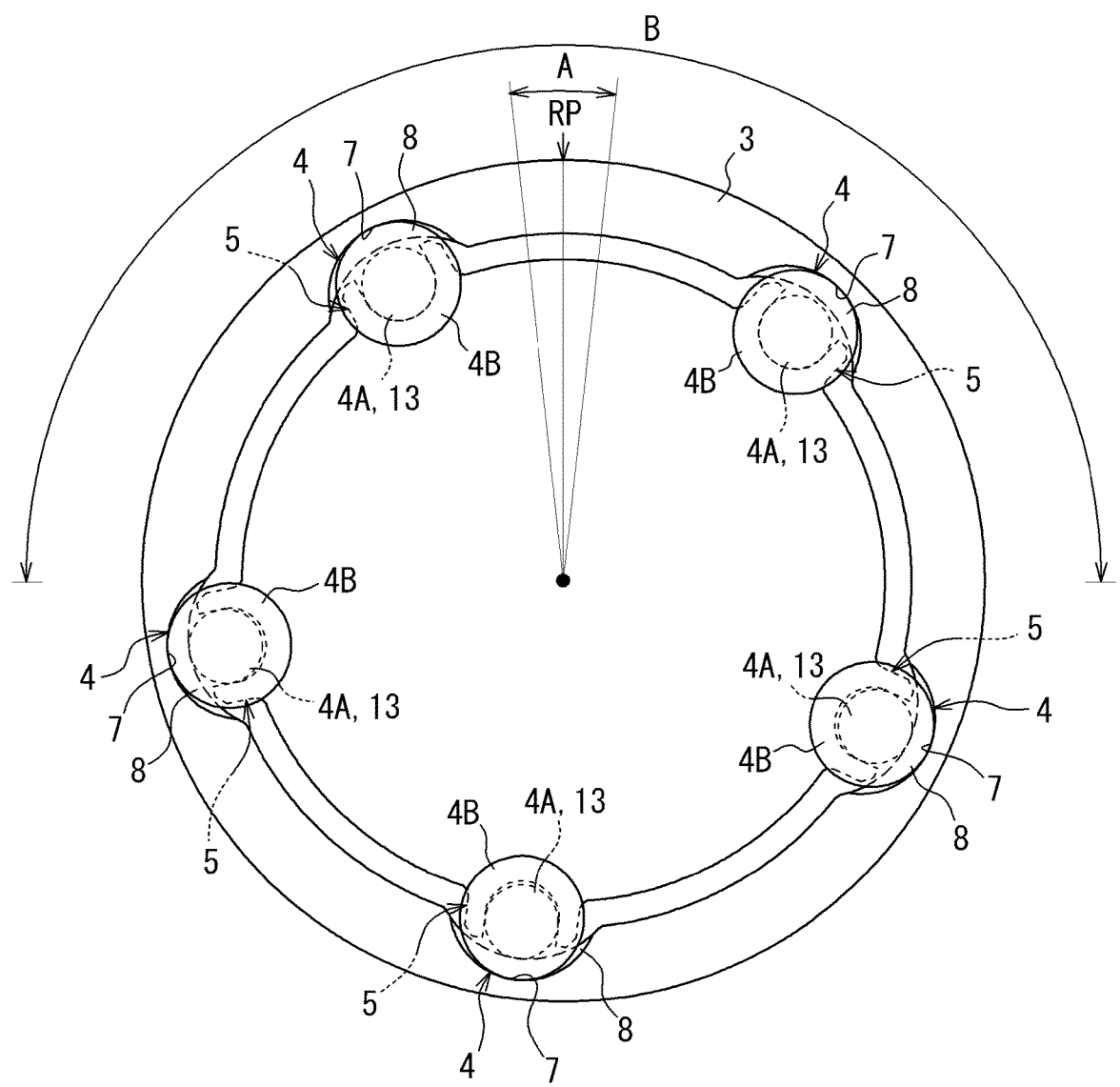
FIG. 10 is a front view showing the torsional vibration damper according to a third example of the present disclosure.

Turning to FIG. 10, there is shown the torsional vibration damper 1 according to the third example of the present disclosure. According to the third example, five rolling masses 4 re arranged in the torsional vibration damper 1. Accordingly, five retainers 5 are formed on the circumference of the rotary member 2 at regular intervals, and the rolling mass 4 is held in each of the retainers 5. Likewise, five raceway surfaces 7 are formed on the inner circumference of the inertia body 3 at regular intervals. The remaining structure of the torsional vibration damper 1 according to the third example is identical to that of the first example, and detailed explanations for the common structure will be omitted.

Figure 11:
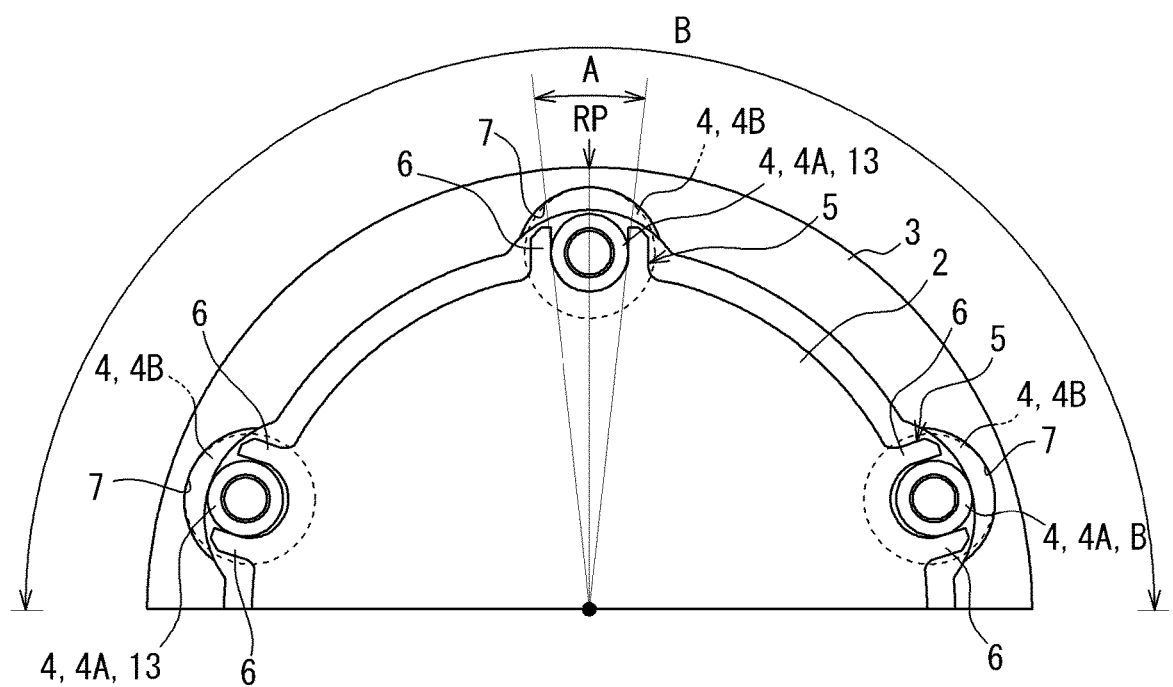
FIG. 11 is a front view showing a situation in which one of rolling masses of the torsional vibration damper according to the third example is situated within the predetermined range.

If the rotary member 2 according to the third example is stopped at an angle shown in FIG. 11 as a result of stopping the engine 22, one of the rolling masses 4 situated within the predetermined range A drops gravitationally and the diametrically smaller section 4A thereof comes into contact to a bottom of the retainer 5, and the inertia body 3 drops gravitationally against said one of the rolling masses 4.

In this situation, the other two of the rolling masses 4 situated within the upper half section B of the rotary member 2 outside of the predetermined range A are supported by the lower stoppers 6 of the retainers 5 without being contacted to the inertia body 3. That is, the inertia body 3 is supported by only one of the rolling masses 4. In this case, therefore, the above-explained disadvantages of the case in which the rotary member 2 according to the first example stoppes at the angle shown in FIG. 5A will also occur. In order to avoid the above-explained disadvantages, as shown in FIG. 10, the rotary member 2 according to the third example is also mounted e.g., on the output shaft 26 of the engine 22 in such a manner that none of the rolling masses 4 is situated within the predetermined range A when the engine 22 is stopped.

According to the third example, therefore, the inertia body 3 is also supported by the plurality of the rolling masses 4 when stopping the engine 22. For this reason, the above-explained advantages of the torsional vibration damper 1 according to the first example may also be achieved by the torsional vibration damper 1 according to the third example. Optionally the buffer member 35 according to the second example may also be applied to the torsional vibration damper 1 according to the third example.

For example, if the engine 22 is stopped in a compression process, each piston is subjected to a reaction force of the air in a cylinder (neither of which are shown), and consequently the output shaft 26 of the engine 22 is rotated backwardly by the reaction force applied to the pistons. That is, it is difficult to stop the pistons at a top dead center in this case. Therefore, the rotary member 2 may also be mounted on the output shaft 26 in such a manner that one of the rolling masses 4 is situated within the predetermined range A when the pistons are situated at the top dead center. In this case, the rotary member 2 will also be stopped at the angle shown in FIG. 5B or FIG. 10, therefore, the above-explained advantages may also be achieved.

In addition, number of the rolling masses 4 may be altered arbitrarily to the number of the pistons. In this case, the rotary member 2 may also be mounted on the output shaft 26 in such a manner that none of the rolling masses 4 is situated within the predetermined range A when the engine 22 is stopped.

Fourth Example

According to the present disclosure, the rotary member 2 is not necessarily to be mounted on the output shaft 26 in such a manner that none of the rolling masses 4 is situated within the predetermined range A when the engine 22 is stopped. In this case, an angle of the rotary member 2 when stopping the engine 22 may be adjusted by the ECU 34 in such a manner that none of the rolling masses 4 is situated within the predetermined range A when the engine 22 is stopped. To this end, the ECU 34 executes the routine shown in FIG. 12.

Figure 12:
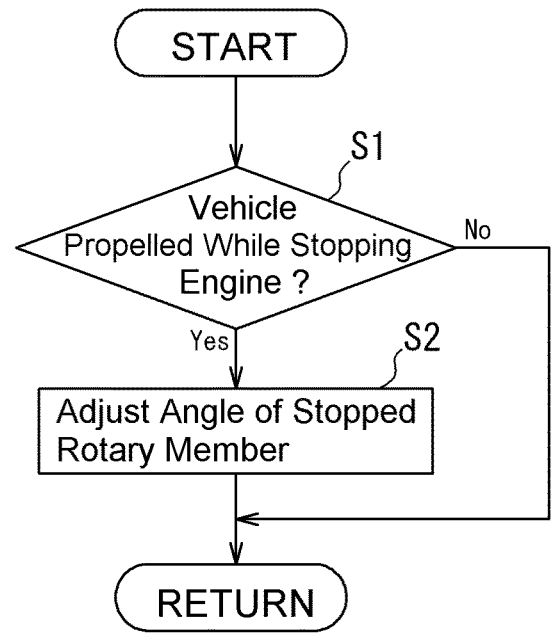
FIG. 12 is a flowchart showing a routine executed by the control device according to a fourth example of the present disclosure.

The routine shown in FIG. 12 is executed repeatedly by the ECU 34 at predetermined time intervals. At step S1, it is determined whether the vehicle is propelled in the electric vehicle mode while stopping the engine 22. As described, the electric vehicle mode is selected when the required torque governed by a position of the accelerator torque is relatively small. Therefore, such determination at step S1 may be made based on a position of the accelerator pedal or a required torque to propel the vehicle. Instead, the determination at step S1 may also be made based on a command signals transmitted to the engine 22 and the motor 20. If the vehicle is not propelled in the electric vehicle mode so that the answer of step S1 is NO, the routine returns without carrying out any specific control.

By contrast, if the vehicle is propelled in the electric vehicle mode so that the answer of step S1 is YES, the routine progresses to step S2 to adjust an angle of the rotary member 2 being stopped. At step S2, specifically, the ECU 34 transmits a command signal to the generator 24 to rotate the output shaft 26 of the engine 22 to the angle shown in FIG. 5B or FIG. 10. As described, the rotary member 2 is mounted e.g., on the output shaft 26 of the engine 22 to be rotated integrally therewith. Therefore, for example, positions of the rolling masses 4 may be estimated when the engine 22 is stopped based on a crank angle of the output shaft 26 detected by a crank angle sensor (not shown). Optionally, at step S2, an angle of the rotary member 2 being stopped may also be adjusted to an angle at which the engine 22 may be started up smoothly. Thereafter, the routine returns.

According to the fourth example, therefore, the rotary member 2 may also be stopped at the angle shown in FIG. 5B or FIG. 10. For this reason, the above-explained advantages of the torsional vibration damper 1 according to the first example may also be achieved.

Although the above examples of the present disclosure have been described, it will be understood by those skilled in the art that the present disclosure should not be limited to the described examples, and various changes and modifications can be made within the scope of the present disclosure. For example, the torsional vibration damper 1 and the ECU 34 may also be applied to a vehicle shown in FIG. 13. In the vehicle shown in FIG. 13, a power split mechanism 38 is arranged coaxially with the output shaft 26 of the engine 22 to distribute the torque of the engine 22 to the generator 24 and an output member. For example, a single-pinion planetary gear unit that performs a differential action among three rotary elements may be adopted as the power split mechanism 38. The power split mechanism 38 comprises a sun gear S, a ring gear R arranged coaxially around the sun gear S, a plurality of pinion gears P interposed between the sun gear S and the ring gear R, and a carrier C supporting the pinion gears P in a rotatable manner.

In the power split mechanism 38, the carrier C is connected to the output shaft 26 of the engine 22 through an input shaft 38a, the sun gear S is connected to the generator 24, and the ring gear R is connected to an output gear 39. In the vehicle shown in FIG. 13, an oil pump is disposed between the engine 22 and the power split mechanism 38 while being connected to the input shaft 38a of the power split mechanism 38.

A countershaft 41 extends in parallel to a rotational center axis of the power split mechanism 38. A driven gear 42 is mounted on one end of the countershaft 41 to be meshed with the output gear 39, and a drive gear 43 is mounted on the other end of the countershaft 41 to be meshed with a ring gear 44 of a differential gear unit as a final reduction. The driven gear 42 is also meshed with a drive gear 45 mounted on the rotor shaft of the motor 20 so that the output torque of the motor 20 is synthesized with a torque of the output gear 39. The torque delivered to the drive gear 43 is distributed to the front wheels 21 from the differential gear unit.

As described, the torsional vibration damper 1 according to the present disclosure transmits the torque of the engine 22 to the transmission 25 while smoothening. To this end, in the vehicle shown in FIG. 13, the torsional vibration damper 1 may be arranged in a region F between the engine 22 and the generator 24, or a region G of downstream of the power split mechanism 38. In those cases, the torsional vibration damper 1 may be mounted on the output shaft 26 of the engine 22 or the carrier C of the power split mechanism 38 to be rotated integrally therewith. In any of those cases, the rotary member 2 is mounted on the output shaft 26 or the carrier C in such a manner that none of the rolling masses 4 is situated within the predetermined range A when the engine 22 is stopped. Otherwise, an angle of the rotary member 2 when stopping the engine 22 may also be adjusted by the ECU 34 in such a manner that none of the rolling masses 4 is situated within the predetermined range A when the engine 22 is stopped.

Figure 13:
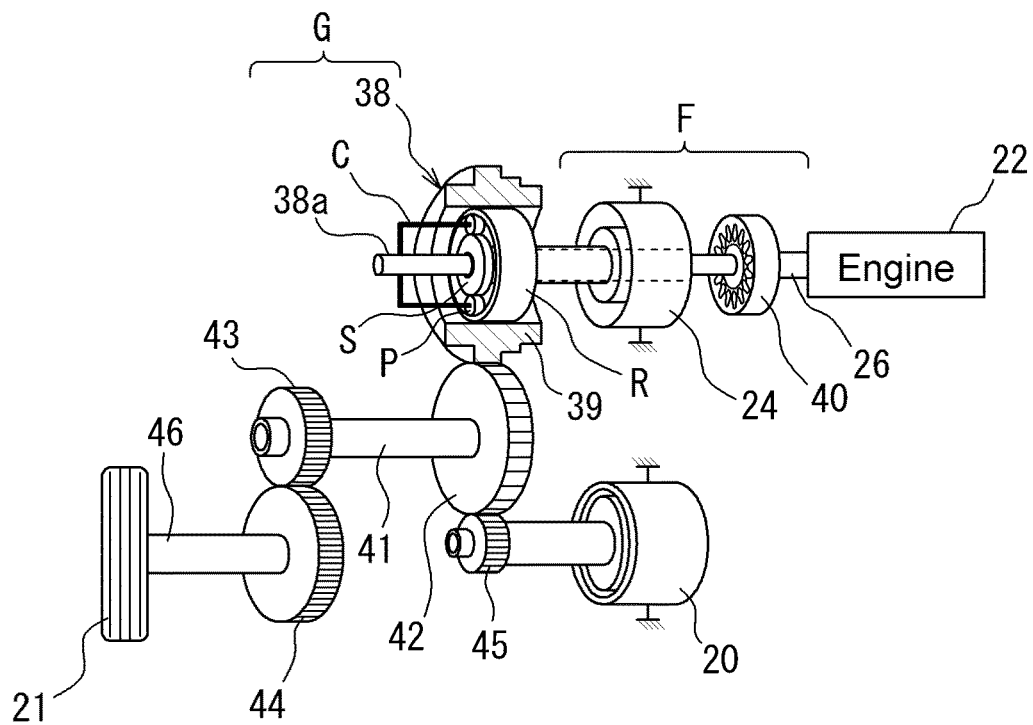
FIG. 13 is a schematic illustration showing another example of the vehicle to which the torsional vibration damper and the control device thereof according to the present disclosure is applied.

In the case of mounting the rotary member 2 on e.g., the output shaft 26 of the engine 22 in the vehicle shown in FIG. 13, the above-explained advantages of the torsional vibration damper 1 according to the first example may also be achieved. Optionally the buffer member 35 according to the second example may also be applied to the torsional vibration damper 1 also in this case.

Likewise, the above-explained advantages of the torsional vibration damper 1 according to the first example may also be achieved in the case of adjusting an angle of the rotary member 2 when stopping the engine 22 by executing the routine shown in FIG. 12.

What is claimed is:
1. A torsional vibration damper, comprising:
a rotary member that is rotated integrally with an output shaft of an engine;
a plurality of rolling masses, each of which is held by the rotary member to revolve around a rotational center axis of the rotary member by rotating the rotary member, while being allowed to move in a radial direction; and
an inertia body that is arranged concentrically with the rotary member, wherein the inertia body comprises a plurality of raceway surfaces to which the rolling masses are contacted centrifugally, a curvature radius of each of the raceway surfaces is individually shorter than a curvature radius of an outer circumference of the rotary member, the output shaft of the engine is stopped at a predetermined angle when stopping the engine, the rotary member is mounted on the output shaft such that none of the rolling masses is situated within a predetermined angle range of the rotary member immediately above the rotational center axis of the rotary member when the engine is stopped, and the predetermined angle range is a range in which the inertia body is to be supported by only one of the rolling masses gravitationally dropped onto the rotary member.

2. The torsional vibration damper as claimed in claim 1, wherein the inertia body includes a ring-shaped member in which an inner diameter is larger than an outer diameter of the rotary member, the inertia body is arranged around the rotary member while being overlapped at least partially in an axial direction, and the torsional vibration damper further comprises a buffer member that is interposed between the rotary member and the inertia body to absorb a collision impact of the inertia body drooped gravitationally when stopping the engine.

3. A control device for the torsional vibration damper comprising:

a rotary member that is rotated integrally with an output shaft of an engine;

a plurality of rolling masses, each of which is held by the rotary member to revolve around a rotational center axis of the rotary member by rotating the rotary member, while being allowed to move in a radial direction; and an inertia body that is arranged concentrically with the rotary member, wherein the inertia body comprises a plurality of raceway surfaces to which the rolling masses are contacted centrifugally, a curvature radius of each of the raceway surfaces is individually shorter than a curvature radius of an outer circumference of the rotary member, the control device comprises a controller that controls an angle of the rotary member when stopping the engine, the controller is configured to adjust the angle of the output shaft such that none of the rolling masses is situated within a predetermined angle range of the rotary member immediately above the rotational center axis of the rotary member when the engine is stopped, and the predetermined angle range is a range in which the inertia body is to be supported by only one of the rolling masses gravitationally dropped onto the rotary member.

4. The control device for the torsional vibration damper as claimed in claim 3, wherein the inertia body includes a ring-shaped member in which an inner diameter is larger than an outer diameter of the rotary member, the inertia body is arranged around the rotary member while being overlapped at least partially in an axial direction, and the torsional vibration damper further comprises a buffer member that is interposed between the rotary member and the inertia body to absorb a collision impact of the inertia body drooped gravitationally when stopping the engine.

5. The control device for the torsional vibration damper as claimed in claim 3, wherein the output shaft is connected to a motor, and the controller is further configured to adjust the angle of the output shaft such that none of the rolling masses is situated within the predetermined angle range by controlling the motor when the engine is stopped.

* * * * *